(12) United States Patent
Jeihani et al.

(10) Patent No.: US 11,565,711 B2
(45) Date of Patent: Jan. 31, 2023

(54) SYSTEM AND METHOD FOR GENERATING VEHICLE SPEED ALERTS

(71) Applicant: Morgan State University, Baltimore, MD (US)

(72) Inventors: Mansoureh Jeihani, Lutherville, MD (US); Samira Ahangari, Baltimore, MD (US); Zohreh Rashidi Moghaddam, Baltimore, MD (US)

(73) Assignee: MORGAN STATE UNIVERSITY, Baltimore, MD (US)

( * ) Notice: Subject to any disclaimer, the term of this patent is extended or adjusted under 35 U.S.C. 154(b) by 50 days.

(21) Appl. No.: 16/923,224

(22) Filed: Jul. 8, 2020

(65) Prior Publication Data

US 2021/0009152 A1    Jan. 14, 2021

Related U.S. Application Data

(60) Provisional application No. 62/959,215, filed on Jan. 10, 2020, provisional application No. 62/871,360, filed on Jul. 8, 2019.

(51) Int. Cl.
*B60W 50/14* (2020.01)
*B60W 40/08* (2012.01)
*B60W 40/105* (2012.01)

(52) U.S. Cl.
CPC ............ *B60W 50/14* (2013.01); *B60W 40/08* (2013.01); *B60W 40/105* (2013.01);
(Continued)

(58) Field of Classification Search
CPC .... B60W 50/14; B60W 40/08; B60W 40/105; B60W 2050/143; B60W 2050/146; B60W 2520/00; B60W 2540/227; B60W 2552/00
See application file for complete search history.

(56) References Cited

U.S. PATENT DOCUMENTS 7,741,962 B2    6/2010   Kalik
7,881,914 B2    2/2011   Trotta et al.
(Continued)

OTHER PUBLICATIONS

"Enhanced game mode for Eco-driving simulator." S. Beloufa, F. Cauchard, et al. Driving Simulation Conference 2012, Sep. 2012, France, pp. 1-10. (Year: 2012).*

(Continued)

*Primary Examiner* — Peter D Nolan
*Assistant Examiner* — Tanya C Sienko
(74) *Attorney, Agent, or Firm* — Whiteford, Taylor & Preston, LLP; Gregory M. Stone (57) ABSTRACT

Disclosed is a system and method for generating a vehicle speed alert in a driving simulation system that communicates with a remote driving simulator engine and a remote speed optimization engine. The remote speed optimization engine receives data from the vehicle speed alert system after the vehicle speed alert system has received data from the remote driving simulator engine, including the vehicle's simulated distance to a signalized intersection, the time remaining for the simulated traffic light to change, and the current simulated light status (green, yellow, red) of the traffic light. The vehicle speed alert system then receives from the remote speed optimization engine a recommended speed profile for that given instant, and if the driver's current speed does not fall within some maximum difference with the current recommended speed profile, calculates and transmits an alert to an output device to alert the driver of action necessary to achieve the recommended speed profile.

7 Claims, 4 Drawing Sheets

(52) U.S. Cl.
CPC . *B60W 2050/143* (2013.01); *B60W 2050/146* (2013.01); *B60W 2520/00* (2013.01); *B60W 2540/227* (2020.02); *B60W 2552/00* (2020.02)

(56) References Cited

U.S. PATENT DOCUMENTS

| | | | |
|---|---|---|---|
| 9,002,720 | B2 | 4/2015 | Nepomuceno |
| 9,702,719 | B2 | 7/2017 | Mason et al. |
| 9,728,015 | B2 | 8/2017 | Kwak |
| 10,223,479 | B1 | 3/2019 | Konrardy et al. |
| 10,232,861 | B2 | 3/2019 | Huang et al. |
| 2019/0295335 | A1 | 9/2019 | Amelunxen et al. |

OTHER PUBLICATIONS

"The Effects of the Use of Serious Game in Eco-Driving Training" by H. Hrimech et al., Frontiers in ICT, Oct. 2016, vol. 3, Article 22 (Year: 2016).*

"Situation Awareness in Eco-Driving" S. Thill and M. Riveiro. 2015 IEEE International Multi-Disciplinary Conference on Cognitive Methods in Situation Awareness and Decision Support (CogSIMA) (Year: 2015).*

"Interface design considerations for an in-vehicle eco-driving assistance system" A> Jamson, D. Hibberd, ad N. Merat. Transportation Research Part C 58 (2015) pp. 642-656 (Year: 2015).*

"Simulateur Eco conduite Ville" Apr. 25, 2017. 3:53 minutes.https://youtu.be/4kmpJVyLDzE Renault Eco simulator showing driving through a city landscape and with coming up to a traffic light which goes through its cycle: 1:08-1:23. feedback for driver on energy efficiency: 3:37-3:46 (Year: 2017).*

"Development of driving simulator based eco-driving support system" X. Zhao et al., Transportation Research Part C (2015) pp. 631-641 (Year: 2015).*

"Driving Simulator Study: Eco-Driving Training System Based on Individual Characteristics" Y.Yao et al. Transportation Research Record 2019 vol. 2673(8) 463-476 (Year: 2019).*

"Dynamic Eco-Driving Speed Guidance at Signalized Intersections: Multivehicle Driving Simulator Based Experimental Study", P.Chen et al. Journal of Advanced Transportation vol. 2018 May 7, 2018 (Year: 2018).*

"AERIS: Eco-Vehicle Speed Control at Signalized Intersections Using I2V Communication Final Report", H. Rakha, R. Kamalanathsharma, and K. Ahn, Report No. FHWA-JPO-12-063, U.S. Department of Transportation, Research and Innovative Technology Administration, Jun. 2012.

"Field Testing of Eco-Speed Control Using V2I Communication", Final Research Reports, H. Rakha et al., Advanced Operations Focused on Connected Vehicles / Infrastructure (CVI-UTC), U.S. Department of Transportation, Research and Innovative Technology Administration, Apr. 15, 2016.

* cited by examiner

SYSTEM AND METHOD FOR GENERATING VEHICLE SPEED ALERTS

CROSS REFERENCE TO RELATED APPLICATIONS

This application is based upon and claims the benefit of U.S. Provisional Application No. 62/871,360 titled "Interface Between Traffic Light Optimization Algorithm and Driving Simulator," filed with the United States Patent & Trademark Office on Jul. 8, 2019, and is further based upon and claims the benefit of U.S. Provisional Application No. 62/959,215 titled "A Multipurpose Adaptive Eco-Driving System Applicable to Driving Simulators," filed with the United States Patent & Trademark Office on Jan. 10, 2020, the specifications of which are incorporated herein by reference in their entireties.

FIELD OF THE INVENTION

This invention is directed to computer-assisted or "smart" driving systems and methods, and more particularly to systems and methods for alerting a driver using a driving simulation system of recommended changes to the speed at which they are operating a vehicle based on the simulated speed and location of the vehicle with respect to an upcoming traffic signal, and the current state of that traffic signal.

BACKGROUND OF THE INVENTION

The environmental impact of the use of fossil fuels, and particularly the burning of fossil fuels exhibited by modern vehicular traffic, is of significant concern and the topic of much study. An important aspect relating to vehicular traffic's consumption of fossil fuels is fuel economy, such that systems and methods have been employed to improve fuel economy and, thus, reduce any negative impacts of vehicular traffic's consumption of fossil fuels on the environment. While various motor vehicle systems are constantly under development to improve on such fuel economy, the vehicle operator or driver themselves also have a significant impact, such that understanding and preferably modifying driver behavior to better control fuel consumption may significantly improve fuel economy.

For example, studies have shown that vehicle fuel consumption levels near signalized intersections are dramatically increased due to the driver's deceleration and acceleration of the vehicle as they approach and travel through the intersection. Studies have focused on changing traffic signal timing to optimize vehicles' fuel demand levels, and researchers have attempted to use connected vehicle ("CV") technology and infrastructure technologies to develop eco-driving strategies that are more fuel efficient. For example, Eco-Speed Control ("ESC") was developed to optimize individual vehicle fuel consumption by recommending a fuel-efficient trajectory using advanced information from surrounding vehicles and upcoming signalized intersections. One such ESC system that was developed that computes and recommends a fuel-efficient speed profile in a CV environment is described in Virginia Tech Transportation Institute, Connected Vehicle/Infrastructure University Transportation Center (CVI-UTC), "Field Testing of Eco-Speed Control Using V2I Communication," Apr. 15, 2016, which document is incorporated herein by reference in its entirety.

As such fuel-saving analytical tools require manual engagement by the driver (unless employed in an automated vehicle), they are dependent upon the driver's response to the recommended speed profile that such system provides. For the system to achieve its intended benefit, the driver must both become aware of the ideal speed that will maximize fuel economy, and then actually react to that knowledge by modifying their speed to match the ideal speed.

One tool that may be useful in evaluating a driver's willingness and ability to adapt their speed to such a recommended ideal speed as they are approaching an intersection with a traffic signal are driving simulators. Driving simulators offer a valuable training tool that allow driver's to hone and improve driving skills without the physical risks associated with operating on the open road, and thus may likewise be valuable in determining the driver's ability and willingness to modify their vehicle speed in response to a directed ideal speed without incurring the expense and fuel waste that would be associated with such training on the open road.

Unfortunately, however, while computer-generated artificial environments are increasing in complexity and realism, driving simulators to date are of limited capabilities in actually simulating a real-world environment that a driver will actually encounter when operating a physical vehicle on the open road. A highly sophisticated, alternate reality environment has, however, been created by FORUM8 Co. Ltd., of Tokyo, Japan, which offers readily commercially available driving simulation software known as UC-win/Road, which software is capable of creating and editing a complete network of traffic elements, including road alignments, intersection design, traffic signals, cross sections, roadside signs, terrain setup, and traffic generation. The FORUM8 UC-win/Road simulator is capable of replicating the driving task on different roadway and pavement types, under various traffic conditions and compositions, using varied traffic information (e.g., dynamic message signs), and under various weather conditions (e.g., rain, fog, snow, etc.), and is capable of building networks with desired features similar to the real world.

Thus, in order to better evaluate driver response to automated ESC systems that may generate a recommended speed profile, it would be advantageous to provide systems and methods able to process data received from a driving simulator that creates a true virtual reality driving environment, such data including simulated vehicle speed and location data in relation to an intersection having a traffic signal, determine an ideal speed based on that current speed and location data that will maximize fuel economy as the driver approaches and travels through the intersection, and alert the driver to that ideal speed so that the driver may adjust their speed to match that calculated ideal speed, and so that the driver's response to the ideal speed alert may be observed.

SUMMARY OF THE INVENTION

Disclosed is a system and method for generating a vehicle speed alert, particularly in a driving simulation system, that communicates with a remote driving simulator engine capable of generating a virtual reality driving environment that monitors vehicle speed, position, and signal status of traffic signals at signalized intersections in the virtual environment, and that communicates with a remote speed optimization engine that calculates an ideal speed profile calculated to maximize fuel economy as the vehicle in the virtual environment approaches and proceeds through the signalized intersection. The remote speed optimization engine receives data from the vehicle speed alert system after the vehicle speed alert system has received data from the remote driving simulator engine, including the vehicle's distance to the signalized intersection, the time remaining for the traffic light to change, and the current light status (green, yellow, red) of the traffic light. The vehicle speed alert system then receives from the remote speed optimization engine that recommended speed profile for that given instant, and if the driver's current speed does not fall within some minimal difference with the current recommended speed profile, calculates and transmits an alert to an output device to alert the driver of action necessary to achieve the recommended speed profile. For example, the vehicle speed alert may generate a message that displays the recommended speed, or that provides a graphical or textual message indicating that the driver should either speed up or slow down in order to match the recommended speed, or both. Optionally, if the driver's current speed matches the recommended speed profile, the vehicle speed alert system may generate an alert instructing the driver to maintain their current speed. Such steps are preferably repeated every 0.1 seconds as the driver approaches and proceeds through the signalized intersection so that the driver may at all times be alerted to the currently recommended speed, and so that the driver's response to the recommended speed profile may be monitored and recorded. Preferably, in order to minimize distraction and annoyance, the recommended speed is only reported to the driver every 2-3 seconds.

In accordance with certain aspects of an embodiment of the invention, system for generating a speed modification alert is provided, comprising: one or more processors; and one or more memories coupled to the one or more processors, wherein the one or more memories are configured to provide the one or more processors with instructions which when executed cause the one or more processors to: receive at a vehicle speed alert system virtual speed and position data from a driving simulator engine; transmit at least a portion of the virtual speed and position data from the vehicle speed alert system to a speed optimization engine; receive at the vehicle speed alert system an ideal speed profile from the speed optimization engine; compare at the vehicle speed alert system a user's current virtual vehicle speed to a current recommended speed in the ideal speed profile to determine whether the current virtual speed is within a maximum differential from the current recommend speed; and in response to determining that the user's current virtual vehicle speed is outside of the maximum differential from the current recommend speed, transmit an alert to an output device configured to alert the user to modify their virtual speed.

In accordance with further aspects of an embodiment of the invention, a method for generating a speed modification alert is provided, comprising: receiving at a processor of a computer-implemented vehicle speed alert system virtual speed and position data from a driving simulator engine; transmitting from the vehicle speed alert system at least a portion of the virtual speed and position data from the vehicle speed alert system to a speed optimization engine; receiving at the vehicle speed alert system an ideal speed profile from the speed optimization engine; comparing at the processor of the vehicle speed alert system a user's current virtual vehicle speed to a current recommended speed in the ideal speed profile to determine whether the current virtual speed is within a maximum differential from the current recommend speed; and in response to determining that the user's current virtual vehicle speed is outside of the maximum differential from the current recommended speed, transmitting from the vehicle speed alert system an alert to an output device configured to alert the user to modify their virtual speed.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1:
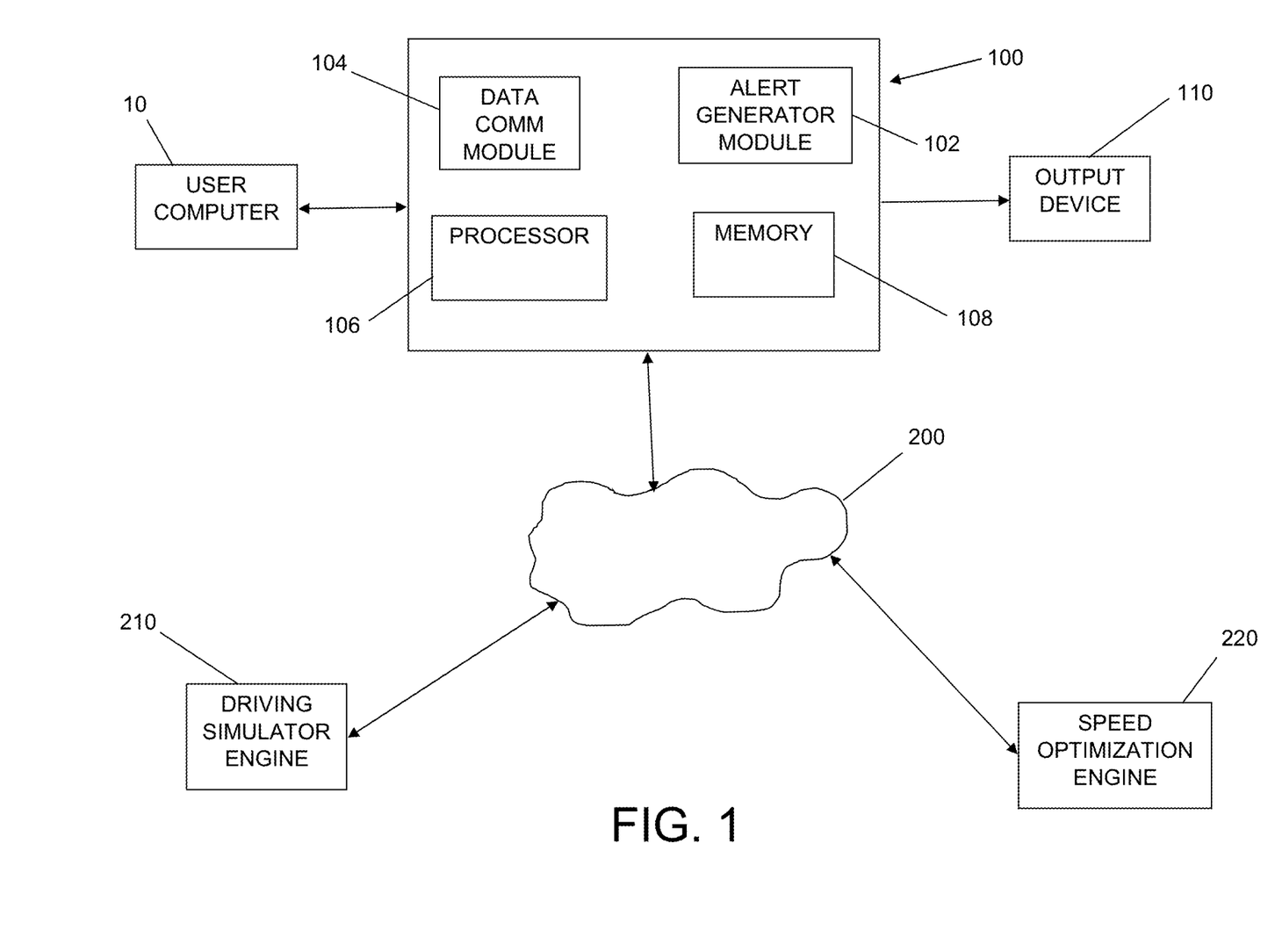
FIG. 1 is a schematic view of a system for generating a speed modification alert in accordance with certain aspects of an embodiment of the invention and showing the interaction between the user and output device, as powered by a driving simulator engine and speed optimization engine.

In accordance with certain aspects of an embodiment of the invention, FIG. 1 shows a schematic view of a system for generating an ideal speed alert, particularly for use in alerting a driver using a driving simulator of an ideal speed profile as they are approaching a signalized intersection. A computer-implemented vehicle speed alert system 100 is provided, which includes an alert generator module 102, a data communication module 104, a processor 106, and memory 108. Vehicle speed alert system 100 is in data communication with an output device 110, which (as discussed in greater detail below) is configured to provide an operator of a driving simulator with an audio, visual, or both audio and visual alert of a recommending change to the speed at which they are operating a vehicle in the simulated driving environment as they approach a signalized intersection in that environment.

In a particular configuration, vehicle speed alert system is in data communication, such as through a wide area network 200 such as the Internet, with both driving simulator engine 210 and speed optimization engine 220. Driving simulator engine 210 provides a software-implemented engine for creating a virtual reality environment in which a simulated vehicle may be operated, and includes operations for creating and editing a complete network of traffic elements, including by way of non-limiting example road alignments, intersection design, traffic signals, cross sections, roadside signs, terrain setup, and traffic generation. Such a driving simulator system 210 known as UC-WIN/ROAD is readily commercially available from FORUM8 Co. Ltd., of Tokyo, Japan. Further, speed optimization engine 220 provides a software-implemented Eco-Speed Control ("ESC") engine that is configured to optimize individual vehicle fuel consumption by recommending a fuel-efficient trajectory using, by way of non-limiting example, advanced information from surrounding vehicles and upcoming signalized intersections. Such an ESC system that computes and recommends a fuel-efficient speed profile in a CV environment is described in Virginia Tech Transportation Institute, Connected Vehicle/Infrastructure University Transportation Center (CVI-UTC), "Field Testing of Eco-Speed Control Using V2I Communication," Apr. 15, 2016, and may be readily implemented by those skilled in the art based upon such publication.

Data communication module 104 of vehicle speed alert system 100 is configured to manage communications between vehicle speed alert system 100 and each of driving simulator engine 210 and speed optimization engine 220 in order to enable alert generator module 102 to generate alerts through output device 110. More particularly, data communication module 104 monitors a TCP/IP port on the computer that is executing vehicle speed alert system 100 to receive from driving simulator 210 real-time virtual speed and position data relating to the virtual speed and position of a simulated vehicle in a simulated driving environment, including by way of non-limiting example position and speed of the driver's simulated vehicle, distance of the simulated vehicle from a signalized intersection, the current traffic signal status of the traffic signal at the signalized intersection that is in the simulated vehicle's path of travel, and the time remaining for the current signal phase until such signal phase is to be changed, such as from green to yellow, from yellow to red, or from red to green. In a particularly preferred configuration, the foregoing data is received by vehicle speed alert system 100 through the TCP/IP port every 0.1 seconds.

Additionally, data communication module 104 preferably calls speed optimization engine 220 to cause speed optimization engine 220 to calculate an ideal speed profile for the user's virtual vehicle as it approaches the signalized intersection. More particularly, after reception of the real-time virtual speed and position data from driving simulator engine 210 at data communication module 104, data communication module 104 thereafter transmits to speed optimization engine 220 data including at least virtual distance of the user's vehicle to the signalized intersection, the time remaining for the current phase of the traffic light at such intersection to change phase, and the current phase of that traffic signal. In response to receiving such real-time virtual speed and position data, speed optimization engine 220 then calculates an ideal speed profile that is calculated to minimize fuel consumption as the driver approaches the simulated intersection and transmits that ideal speed profile to vehicle speed alert system 100. Preferably, and as with communications with driving simulator engine 210, data communication module 104 carries out such communications with speed optimization engine 220 every 0.1 seconds.

After such ideal speed profile is received by vehicle speed alert system 100, alert generator module 102 then processes such ideal speed profile to generate an alert message and transmit that alert message to output device 110, so that the driver may be alerted to alter their speed, where necessary, to match the speed that has been designated in the ideal speed profile. More particularly, alert generator module 102 compares the driver's current virtual speed to the speed that is currently recommended in the ideal speed profile, and if the driver's current virtual speed is not within some minimum difference from the recommended speed (e.g., within 1 m.p.h. of the recommended speed, although other speed differential thresholds may readily be employed without departing from the spirit and scope of the invention), alert generator module 102 generates an audio, visual, or both audio and visual alert message and transmits such alert message to output device 110 for communication to the driver. In a particular configuration, output device 110 may be a speaker that receives an alert message from alert generator module 102, and audibly announces to the driver to speed up, to slow down, or to change their current speed to a particular value that matches the currently recommended speed. In another configuration, output device 110 may be a display that receives an alert message from alert generator module 102, and visually displays to the driver a message to speed up, to slow down, or to change their current speed to a particular value that matches the currently recommended speed. In still other configurations, output device may include both a speaker and a display.

Figure 2A:
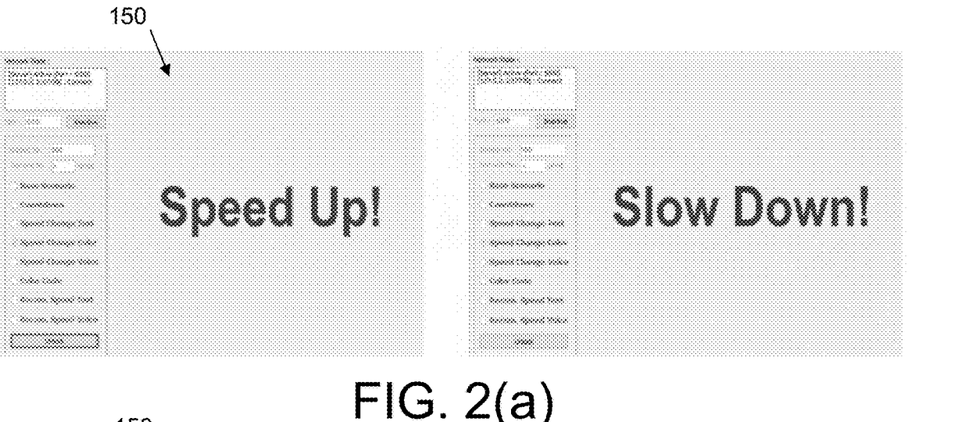
FIGS. 2(a)-2(c) show exemplary display screens generated by the system of FIG. 1 and that may be presented to a driver when approaching a traffic light.
Figure 2B:
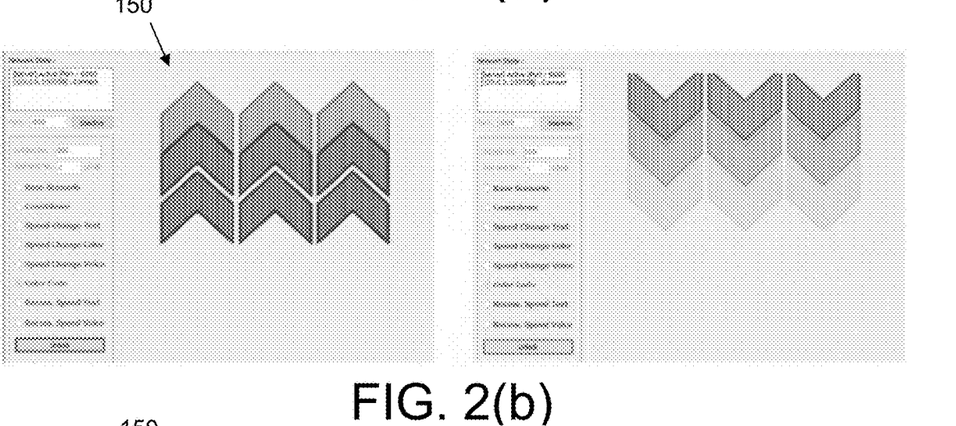
Figure 2C:
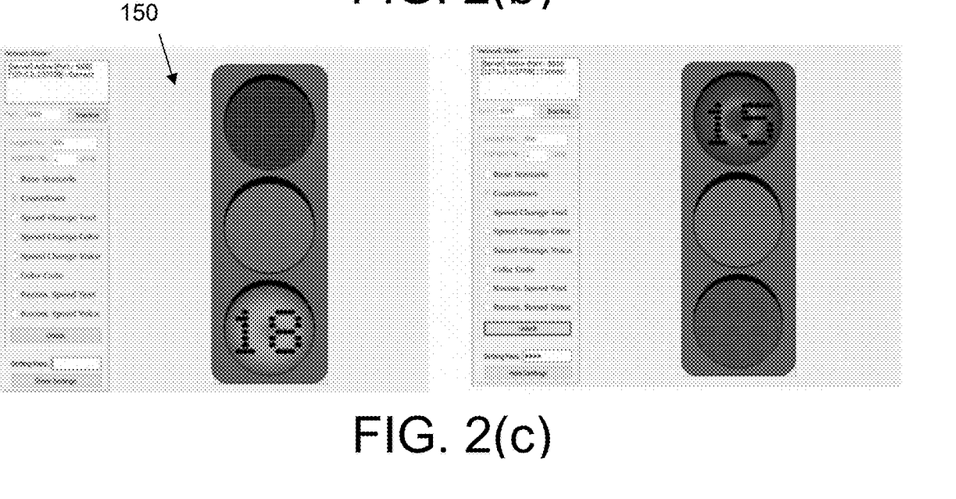

FIGS. 2(a)-2(c) provides schematic views of various exemplary display screens 150 that may be displayed by output device 110 in response to an alert message received from alert generator module 102. As shown in FIG. 2(a), output device 110 may display a textual message to the driver to modify their speed, such as "SPEED UP!", "SLOW DOWN!", "PREPARE TO STOP!", or the like. As shown in FIG. 2(b), output device 110 may likewise display a graphic message to the driver to modify their speed, such as upwardly pointing green arrows to instruct the driver to speed up, or downwardly pointing red arrows to instruct the driver to slow down. Even further and as shown in FIG. 2(c), output device 110 may display a graphic message to the driver showing a representation of a traffic light that displays both of (i) the specific current speed as determined by the ideal speed profile received from speed optimization engine 220, and (ii) the current phase (e.g., green, yellow, or red) of the traffic signal in the virtual signalized intersection that the driver is approaching.

Figure 3:
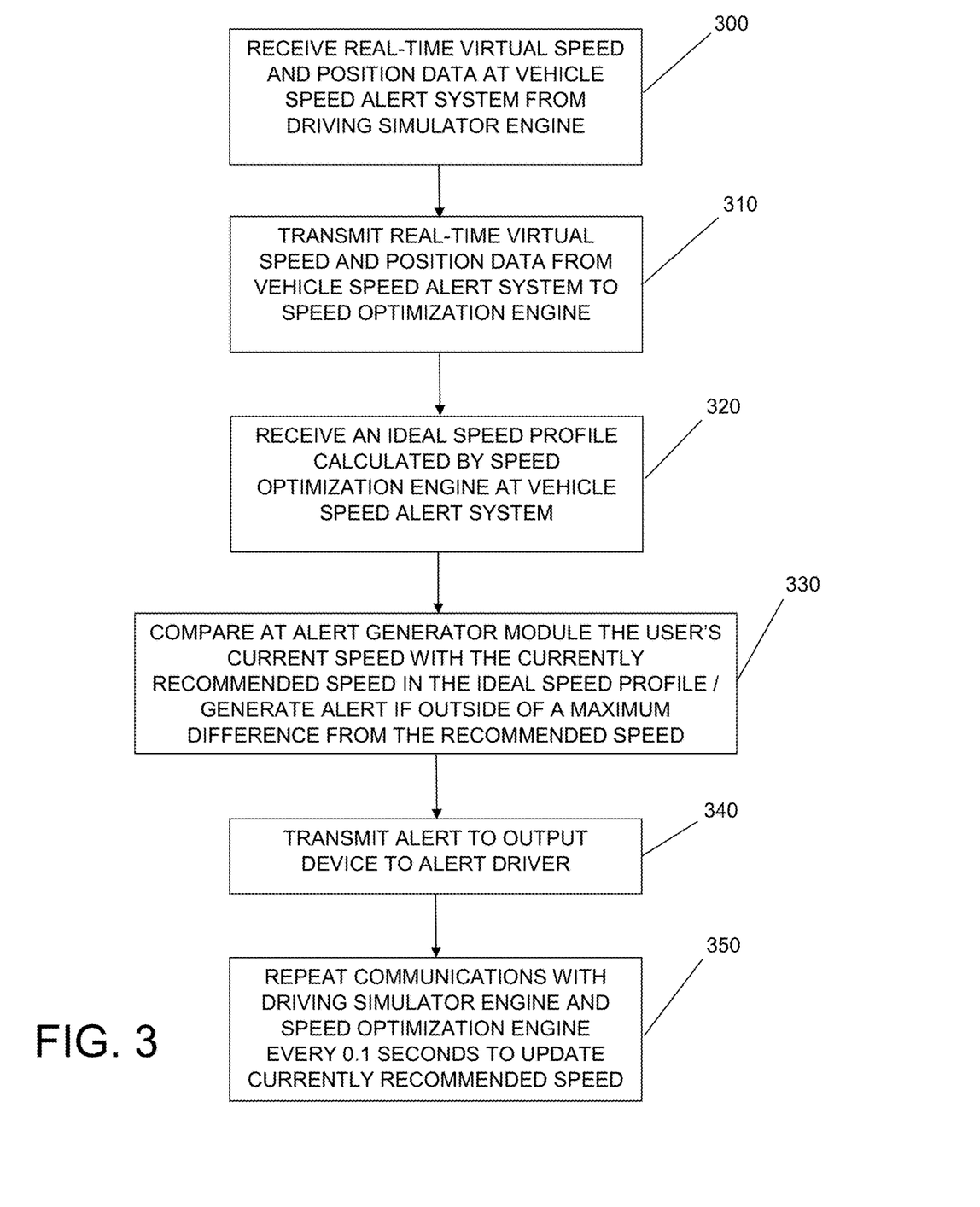
FIG. 3 is a flowchart showing a process for generating a speed modification alert in accordance with certain aspects of an embodiment of the invention and that may be relayed to a user of a vehicle or simulator that operates in a similar manner to a vehicle.

FIG. 3 provides a flowchart showing a process that may be engaged by a user of a vehicle speed alert system 100. At step 300, data communication module 104 of vehicle speed alert system 100 receives real-time vehicle speed and position data from driving simulator engine 210 as described above. Next, at step 310, data communication module 104 of vehicle speed alert system 100 calls speed optimization engine 220, and transmits to speed optimization engine 220 real-time vehicle speed and position data that preferably includes at least virtual distance of the user's vehicle to the signalized intersection, the time remaining for the current phase of the traffic light at such intersection to change phase, and the current phase of that traffic signal. Next, at step 320, data communication module 104 of virtual speed alert system 100 receives an ideal speed profile that has been calculated by speed optimization engine 220. At step 330, alert generator module compares the driver's virtual current speed with the currently recommended speed in the ideal speed profile and generates an alert message if that recommended speed is outside of some maximum difference from the recommended speed. At step 340, alert generator module 102 transmits an alert to output device 340 to alert the driver to alter their speed. At step 350, the communications with driving simulator engine 210 and speed optimization engine 220 are repeated every 0.1 seconds to enable alert generator module 102 to constantly update the currently recommended speed as the driver approaches the virtual signalized intersection.

Figure 4:
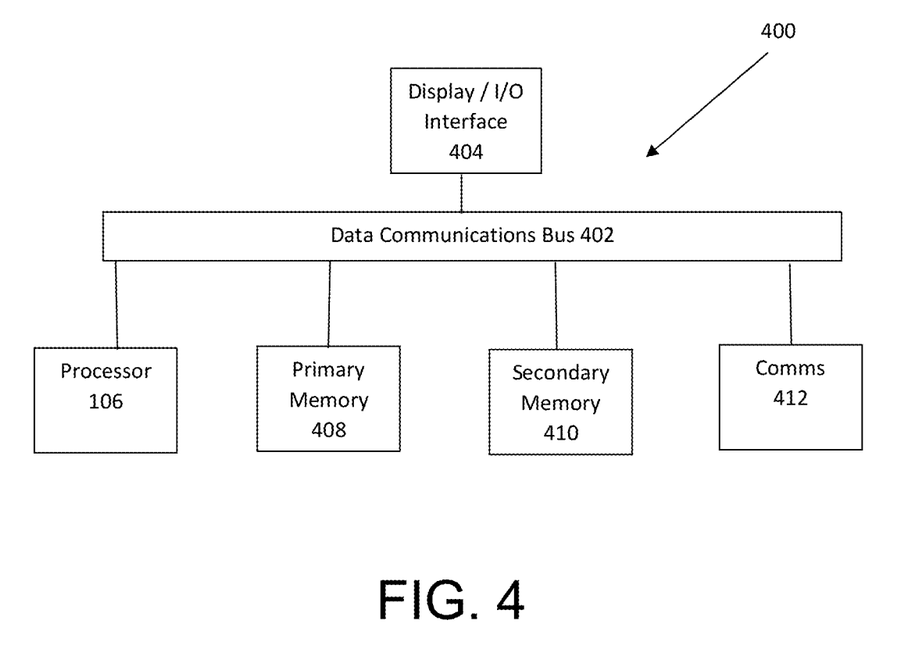
FIG. 4 shows a schematic view of an exemplary computer system suitable for implementing the methods described herein.

Next, FIG. 4 shows an exemplary computer system 400 suitable for implementing the methods described herein. Those skilled in the art will recognize that vehicle speed alert system 100 may take the form of computer system 400 as reflected in FIG. 4, though variations thereof may readily be implemented by persons skilled in the art as may be desirable for any particular installation. In each such case, one or more computer systems 400 may carry out the foregoing methods as computer code.

Computer system 400 includes a communications bus 402, or other communications infrastructure, which communicates data to other elements of computer system 400. For example, communications bus 402 may communicate data (e.g., text, graphics, video, other data) between bus 402 and an I/O interface 404, which may include a display, a data entry device such as a keyboard, touch screen, mouse, or the like, and any other peripheral devices capable of entering and/or viewing data as may be apparent to those skilled in the art, including output device 110. Further, computer system 400 includes a processor 106 as referenced (and shown in FIG. 1), which may comprise a special purpose or a general purpose digital signal processor. Still further, computer system 400 includes memory 108 as referenced above (and shown in FIG. 1), which may include a primary memory 408, which may include by way of non-limiting example random access memory ("RAM"), read-only memory ("ROM"), one or more mass storage devices, or any combination of tangible, non-transitory memory. Still further, memory 108 may include a secondary memory 410, which may comprise a hard disk, a removable data storage unit, or any combination of tangible, non-transitory memory. Finally, computer system 400 may include a communications interface 412, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of primary memory 408, secondary memory 410, communications interface 412, and combinations of the foregoing may function as a computer usable storage medium or computer readable storage medium to store and/or access computer software including computer instructions. For example, computer programs or other instructions may be loaded into the computer system 400 such as through a removable data storage device (e.g., a floppy disk, ZIP disks, magnetic tape, portable flash drive, optical disk such as a CD, DVD, or Blu-ray disk, Micro Electro Mechanical Systems ("MEMS"), and the like). Thus, computer software including computer instructions may be transferred from, e.g., a removable storage or hard disc to secondary memory 410, or through data communication bus 402 to primary memory 408.

Communication interface 412 allows software, instructions and data to be transferred between the computer system 400 and external devices or external networks. Software, instructions, and/or data transferred by the communication interface 412 are typically in the form of signals that may be electronic, electromagnetic, optical or other signals capable of being sent and received by communication interface 412. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow processor 106 of computer system 400 to implement the methods discussed herein for driving and driving simulations according to computer software including instructions.

Computer system 400 may perform any one of, or any combination of, the steps of any of the methods described herein. It is also contemplated that the methods according to the present invention may be performed automatically, or may be accomplished by some form of manual intervention.

The computer system 400 of FIG. 4 is provided only for purposes of illustration, such that the invention is not limited to this specific embodiment. Persons having ordinary skill in the art are capable of programming and implementing the instant invention using any computer system.

Further, computer system 400 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a hand held console, an MP3 player, or other similarly configured small-size, portable computing device as may occur to those skilled in the art.

The system of FIG. 1 may, in an exemplary configuration, be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one of a user computing device 10. The client computer 10 may be any device that may be used to access a distributed computing environment to perform the methods disclosed herein, and may include (by way of non-limiting example) a desktop computer, a portable computer, a mobile phone, a personal digital assistant, a tablet computer, or any similarly configured computing device. Optionally, user computer 10 may include specialized vehicle hardware, such as a steering wheel, gas and brake pedals, an instrument cluster as traditionally found inside of a vehicle, and other physical elements to simulate a physical vehicle.

Client computer 10 preferably includes memory such as RAM, ROM, one or more mass storage devices, or any combination of the foregoing. The memory functions as a computer readable storage medium to store and/or access computer software and/or instructions.

Client computer 10 also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one or more servers via, for example, the Internet, to in turn establish communication with one or more cloud data centers that implement vehicle speed alert system 100. A cloud data center may include one or more networks that are managed through a cloud management system. Each such network includes resource servers that permit access to a collection of computing resources and components of vehicle speed alert system 100, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer useable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof.

The cloud computing environment described above is provided only for purposes of illustration and does not limit the invention to this specific embodiment. It will be appreciated that those skilled in the art are readily able to program and implement the invention using any computer system or network architecture.

Overall, the benefits of controlling traffic using at least some of the systems and methods set forth herein may aid in reducing vehicle emissions, and observing the actions of a driver in a simulated driving environment receiving alerts as discussed above may aid in further refinement of those systems and methods when installed in physical vehicles, and thus even further aid in the reduction of emissions. Driver speed profiles and produced $CO_2$ emissions were compared with driving the same road without any guidance, and with a countdown traffic signal. Descriptive and statistical analyses including Generalized Linear Models (GLM) and t-tests were performed on data obtained from 58 participants with various sociodemographic backgrounds who in total drove more than 2,000 times. The results show that men and younger drivers are more likely to follow the recommended speed. The emission calculations indicate that an ECS system as described herein may decrease the emission level more than countdown timing systems, and the emission level is lower in the countdown timing system compared to regular traffic signals.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, while the exemplary case discussed above describes an analysis that is undertaken with respect to a single intersection, the system may readily be implemented to similarly adapt the ideal speed profile for a series of more than one signalized intersections, and continuously report the recommended speed to the user as discussed above. Similarly, the systems and methods described herein may be used in simulated driving environments for a wide variety of simulated road vehicles, including by way of non-limiting example in simulated cars, trucks, buses, and the like. It should be understood, therefore, that the invention may be practiced otherwise than as specifically set forth herein.

What is claimed is:

1. A system for generating a speed modification alert, comprising:
 a driving simulator system comprising:
  a computer implemented driving simulator engine configured to simulate a driving environment to a user;
  driving input devices comprising at least a driving simulator acceleration pedal configured to provide simulated vehicle speed input to said driving simulator engine; and
  a driving simulator display; and
 a vehicle speed alert system in data communication with said driving simulator system, said vehicle speed alert system comprising:
  one or more processors; and
  one or more memories coupled to said one or more processors, wherein the one or more memories are configured to provide the one or more processors with instructions which when executed cause the one or more processors to:
   receive at the vehicle speed alert system virtual speed and position data from the driving simulator engine, said virtual speed and position data further comprising data indicative of a virtual speed of the user's vehicle, a position of the user's vehicle in a virtual environment, a distance of the user's vehicle from an intersection, a traffic signal status of a virtual traffic signal in the intersection, and a remaining time for changing the traffic signal phase;
   transmit said virtual speed and position data from said vehicle speed alert system to a speed optimization engine;
   receive at said vehicle speed alert system an ideal speed profile from said speed optimization engine, wherein said ideal speed profile is calculated based on said virtual speed and position data;
   compare at said vehicle speed alert system a user's current virtual vehicle speed to a current recommended speed in said ideal speed profile to determine whether said current virtual speed is within a maximum differential from said current recommend speed; and
   in response to determining that said user's current virtual vehicle speed is outside of said maximum differential from said current recommend speed, transmit an alert to said driving simulator display configured to alert said user to modify their virtual speed.

2. The system for generating a speed modification alert of claim 1, wherein said vehicle speed alert system is further configured to receive said virtual speed and position data from said driving simulator engine at a frequency of once every 0.1 seconds.

3. The system for generating a speed modification alert of claim 1, further comprising a speaker configured to announce an audio message to the user comprising a direction to modify the virtual speed of their vehicle.

4. A method for generating a speed modification alert, comprising:
 providing a driving simulator system comprising:
  a computer implemented driving simulator engine configured to simulate a driving environment to a user;
  driving input devices comprising at least a driving simulator acceleration pedal configured to provide simulated vehicle speed input to said driving simulator engine; and
  a driving simulator display;
 receiving at a processor of a computer-implemented vehicle speed alert system in data communication with said driving simulator system virtual speed and position data from said driving simulator engine, said virtual speed and position data further comprising data indicative of a virtual speed of the user's vehicle, a position of the user's vehicle in a virtual environment, a distance of the user's vehicle from an intersection, a traffic signal status of a virtual traffic signal in the intersection, and a remaining time for changing the traffic signal phase;
 transmitting from said vehicle speed alert system said virtual speed and position data from said vehicle speed alert system to a speed optimization engine;
 receiving at said vehicle speed alert system an ideal speed profile from said speed optimization engine, wherein said ideal speed profile is calculated based on said virtual speed and position data;
 comparing at said processor of said vehicle speed alert system a user's current virtual vehicle speed to a current recommended speed in said ideal speed profile to determine whether said current virtual speed is within a maximum differential from said current recommend speed; and
 in response to determining that said user's current virtual vehicle speed is outside of said maximum differential from said current recommend speed, transmitting from said vehicle speed alert system an alert to said driving simulator display configured to alert said user to modify their virtual speed.

5. The method for generating a speed modification alert of claim 4, further comprising receiving at said vehicle speed alert system said virtual speed and position data from said driving simulator engine at a frequency of once every 0.1 seconds.

6. The method for generating a speed modification alert of claim 4, wherein said alert further comprises an audio message to the user comprising a direction to modify the virtual speed of their vehicle.

7. The method for generating a speed modification alert of claim 4, wherein said alert further comprises a visual message to the user comprising a direction to modify the virtual speed of their vehicle.

* * * * *